United States Patent
Lowe et al.

(10) Patent No.: US 11,694,089 B1
(45) Date of Patent: Jul. 4, 2023

(54) DEEP-LEARNED PHOTOREALISTIC GEO-SPECIFIC IMAGE GENERATOR WITH ENHANCED SPATIAL COHERENCE

(71) Applicant: Rockwell Collins, Inc., Cedar Rapids, IA (US)

(72) Inventors: Daniel J. Lowe, Sandy, UT (US); Rishabh Kaushik, Salt Lake City, UT (US)

(73) Assignee: Rockwell Collins, Inc., Cedar Rapids, IA (US)

(*) Notice: Subject to any disclaimer, the term of this patent is extended or adjusted under 35 U.S.C. 154(b) by 292 days.

(21) Appl. No.: 16/781,769

(22) Filed: Feb. 4, 2020

(51) Int. Cl.
*G06N 3/10* (2006.01)
*G06T 17/05* (2011.01)
*G06N 3/04* (2023.01)

(52) U.S. Cl.
CPC ... *G06N 3/10* (2013.01); *G06N 3/04* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 5,309,522 A | 5/1994 | Dye | |
| 7,724,965 B2 | 5/2010 | Aguera y Areas | |
| 7,983,474 B2 | 7/2011 | Van Workum et al. | |
| 8,379,016 B2 | 2/2013 | Ingersoll et al. | |
| 9,347,792 B2 | 5/2016 | Meeker et al. | |
| 10,424,111 B2 | 9/2019 | Stacey | |
| 10,430,682 B2 | 10/2019 | Venkataraman et al. | |
| 2004/0263512 A1* | 12/2004 | Santodomingo et al. | G06T 15/00 345/428 |
| 2008/0131029 A1 | 6/2008 | Coleby et al. | |
| 2009/0271160 A1* | 10/2009 | Copenhagen et al. | G09B 9/00 703/6 |
| 2010/0121172 A1* | 5/2010 | Ladic et al. | G06T 7/33 600/407 |
| 2015/0227808 A1* | 8/2015 | Zharkov | G06V 10/457 345/441 |
| 2015/0327766 A1* | 11/2015 | Gupta et al. | A61B 5/443 382/128 |

(Continued)

FOREIGN PATENT DOCUMENTS

WO 2017066679 A9 4/2017

OTHER PUBLICATIONS

Toulatzis, et al., "Deep Terrain Expansion: Terrain Texture Synthesis with Deep Learning," CGVC, 2019 (Year: 2019).*

*Primary Examiner* — Anh-Tuan V Nguyen
(74) *Attorney, Agent, or Firm* — Suiter Swantz pc llo

(57) ABSTRACT

A simulation environment is disclosed. In embodiments, the simulation environment includes deep learning neural networks trained to generate photorealistic geotypical image content while preserving spatial coherence. The deep learning networks are trained to correlate geo-specific datasets with input images of increasing detail and resolution to iteratively generate output images until the desired level of detail is reached. The correlation of image input with geo-specific data (e.g., labeled data elements, land use data, biome data, elevational data, near-IR imagery) preserves spatial coherence of objects and image elements between output images, e.g., between adjacent levels of detail and/or between adjacent image tiles sharing a common level of detail.

14 Claims, 4 Drawing Sheets

(56) References Cited

U.S. PATENT DOCUMENTS

| | | | |
|---|---|---|---|
| 2017/0169544 A1* | 6/2017 | Boulkenafed et al. | G06T 1/60 |
| 2017/0200301 A1* | 7/2017 | Boissé et al. | G06T 17/05 |
| 2018/0225550 A1* | 8/2018 | Jacobsen et al. | G06F 18/217 |
| 2020/0051327 A1* | 2/2020 | Dolan et al. | G06T 15/04 |
| 2020/0090043 A1* | 3/2020 | Mnih et al. | G06N 3/0445 |
| 2020/0129862 A1* | 4/2020 | Liu et al. | G06T 17/10 |
| 2020/0211256 A1* | 7/2020 | Kim et al. | G06T 15/04 |
| 2020/0242774 A1* | 7/2020 | Park et al. | G06N 20/10 |
| 2021/0041867 A1* | 2/2021 | Clark et al. | G06V 20/17 |
| 2021/0133218 A1* | 5/2021 | Bukowski | G06F 16/2365 |
| 2021/0141986 A1* | 5/2021 | Ganille et al. | G06K 9/6262 |
| 2021/0142559 A1* | 5/2021 | Yousefhussien et al. | G06Q 10/06315 |
| 2021/0158609 A1* | 5/2021 | Raskob et al. | G06K 9/00657 |
| 2021/0178274 A1* | 6/2021 | St-Pierre et al. | A63F 13/50 |

* cited by examiner

DEEP-LEARNED PHOTOREALISTIC GEO-SPECIFIC IMAGE GENERATOR WITH ENHANCED SPATIAL COHERENCE

CROSS-REFERENCE TO RELATED APPLICATIONS

The instant application is related to concurrently filed and commonly owned U.S. Pat. Application 16/781,789, having attorney docket number 125328US01. Said U.S. Pat. Application 16/781,789 is hereby incorporated by reference in its entirety.

BACKGROUND

Deep learning (DL) neural networks may be trained to generate high-resolution imagery, e.g., based on vector metadata. However, while the generated images may be sufficiently photorealistic to pass for actual images of real-world terrain, high-resolution image generation methods do not account for spatial coherence. Multiple generated images comprising a representation of terrain may not be consistent with each other with respect to the position, orientation, or representation (e.g., color, texture) of objects featured within a scene. For example, the same natural or manmade features may be portrayed inconsistently or disjointedly across a series of images.

SUMMARY

A simulator environment is disclosed. In embodiments, the simulator environment includes one or more graphics generation (GG) processors and non-transitory memory connected to the GG processors, the memory capable of storing sets of spatially coherent basemap images of a geographical area (e.g., the whole Earth or a defined subset thereof). The set of basemap images are captured images (e.g., non-generated) and define a minimal level of detail. The memory also stores geo-specific datasets, each dataset associated with specific characteristics (e.g., geographical, elevational, ecological data) of the geographical area. Deep learning (DL) neural networks running on the GG processors are trained on image-based input and the geo-specific datasets to generate spatially coherent output images. For example, the DL neural networks receive input images of a particular location within the geographic area and geo-specific datasets corresponding to the particular location. By correlating the geo-specific datasets to the input images, the DL neural networks generate spatially coherent output images of a higher level of detail than the input images. If the generated output images are not to the desired level of detail, the image generation process reiterates with the output images used as input by the DL neural networks, correlated to the corresponding geo-specific datasets, to generate spatially coherent output images of increasing detail until the desired level of detail (e.g., target image resolution) is reached.

A method for generating spatially coherent photorealistic geo-specific imagery is also disclosed. In embodiments, the method comprises providing to deep learning (DL) neural networks (the DL neural networks running on graphics generator (GG) processors) input images of a location, the input images of a lower level of detail (e.g., than a target or desired level of detail). The method comprises providing to the DL neural networks one or more geo-specific datasets, each geo-specific dataset associated with specific (e.g., geographical, elevational, ecological) characteristics of the location. The method comprises correlating the geo-specific datasets to the input images to generate spatially coherent output images of a higher detail level than the input images. The method comprises, while the detail level of the output images is lower than the desired detail level, generating additional spatially coherent output images of increasingly greater detail by correlating the geo-specific datasets to the initial output images until spatially coherent output images at the desired level of detail (e.g., target image resolution) are reached.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
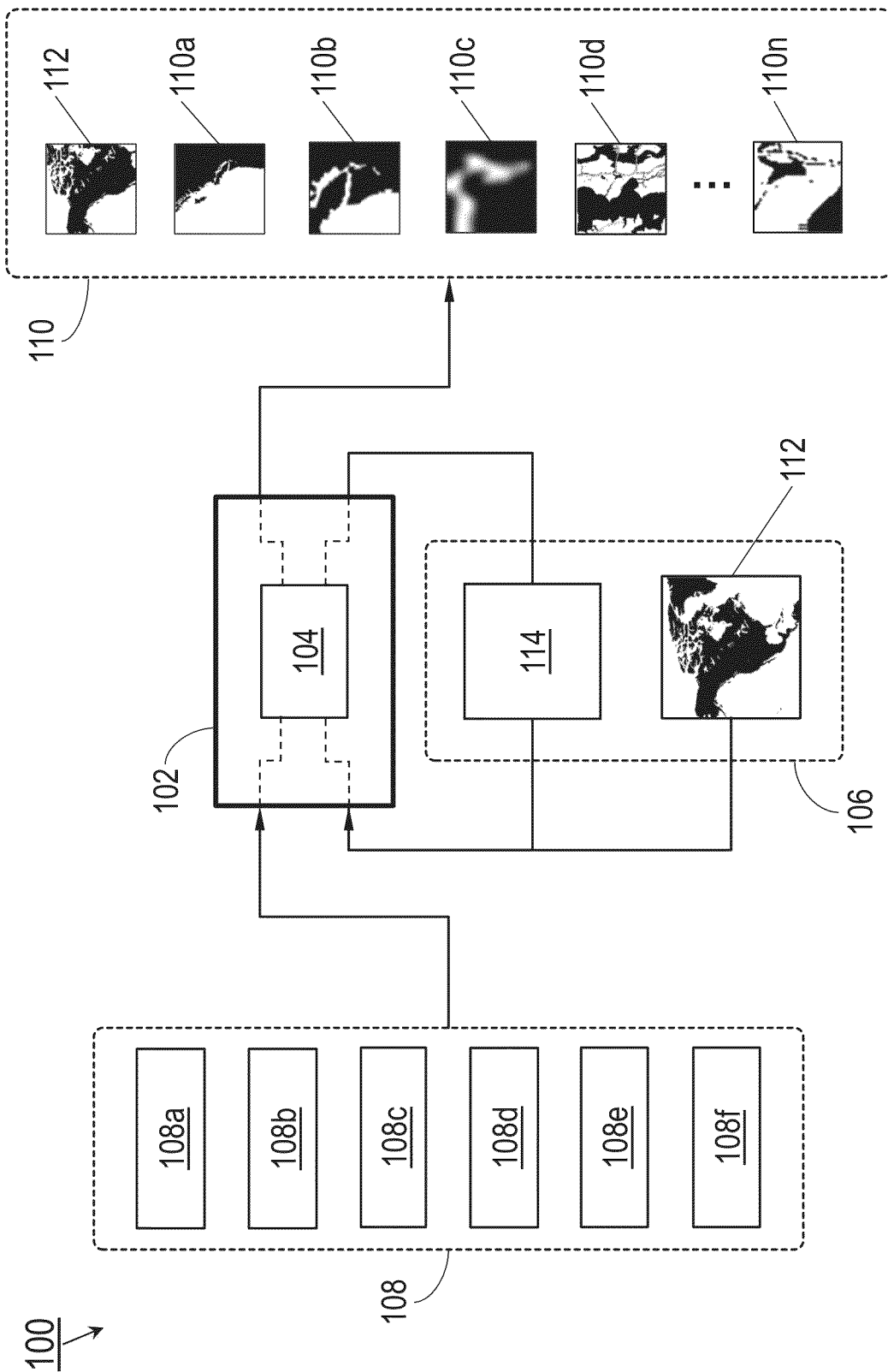
FIG. 1 is a block diagram illustrating a simulator environment in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a simulation environment 100 is disclosed. The simulation environment may include one or more graphics generation (GG) processors 102 and one or more deep learning (DL) neural networks 104 configured to execute on the GG processors.

In embodiments, the DL neural networks 104 may be trained to generate spatially coherent photorealistic geotypical image content, e.g., for flight simulators realistically portraying flight operations over a particular terrain having distinct characteristics and features. For example, the DL neural networks 104 may be extensively trained on combinations of image-based input 106 and geo-specific datasets 108, such that the DL neural networks may generate at runtime photorealistic output images 110 consistent with any desired portion of the whole Earth, at a desired level of detail (e.g., consistent with a simulated altitude above the Earth) and preserving spatial coherence across a given level of detail and/or between adjacent levels of detail.

In embodiments, the DL neural networks 104 may be trained for run-time generation of spatially coherent photorealistic geo-specific output images 110 via iterative correlation of imagery corresponding to a desired location or geographic area (e.g., any subset of the Earth surface) with geo-specific datasets 108 corresponding to the desired location. For example, geo-specific datasets 108 may provide the DL neural networks 104 with additional information about natural features, manmade landmarks, and other characteristics of and within the desired location, such that these features, landmarks, and characteristics can be both precisely located and typically portrayed. In embodiments, typical content within images generated by the DL neural networks 104 refers to image elements that may not be exact reproductions of, or matches for, the features or structures to which they correspond, but accurately and typically, if broadly, represent the relevant characteristics of those features or structures (e.g., areas where roadways, buildings, trees and other vegetation, waterways and other bodies of water may be located).

Geo-specific datasets 108 may include, but are not limited to, the following examples. Geographical vector data 108a may include precise location data for natural features and manmade structures within a geographical area or subset location therewithin, e.g., roadways, bodies of water, shorelines, waterways, buildings, mountains and other geological formations. Geographic vector data 108a may include political boundaries and other labeled mapping data. Elevational data 108b may include elevational grid post and terrain slope information (e.g., a terrain slope associated with an elevational difference between two grid points of known elevation). Ecological data 108c may include biome data, e.g., whether a given portion of land is desert, mountainous, forested, grassland, wetland, or some other biome of combination thereof. Ecological data 108c may further include climactic data, e.g., characteristic precipitation distribution throughout the year indicating whether a particular location (or its image representation) should include snow, foliage, or other seasonal features. Land-use data 108d may indicate whether a portion of land is developed and if so, how, e.g., industrial, residential, agricultural. Infrared (IR) or near-infrared (NIR) imagery 108e may indicate the presence of foliage at, adjacent to, or within a particular location. Target resolution data 108f may provide a target pixel resolution for the spatially coherent photorealistic geo-specific output images 110.

In embodiments, by correlating the diverse geo-specific datasets 108a-f with image-based input 106 of iteratively higher resolution, the DL neural networks 104 may learn to generate spatially coherent high-resolution output images 110 that incorporates photorealistic detail, includes typical content, and maintains spatial coherence. For example, the DL neural networks 104 may correlate the geo-specific datasets 108a-f to image-based input 106 of a given detail level to generate a higher-resolution output image 110 at the next highest detail level. The image-based input 106 may be basemap imagery 112 based on captured satellite imagery or some other non-generated source (e.g., not generated by the DL neural networks 104 or otherwise artificially generated). For example, the basemap imagery 112 may be of a minimal detail level (e.g., level 0), so when the geo-specific datasets 108a-f are correlated to the basemap imagery 112 the initial output images (110a) may be of the next highest detail level (e.g., a level M higher than the minimal detail level 0 but lower than the desired detail level D, as determined by the target resolution data 108f). For example, the detail levels 0, M, D, N as disclosed herein may represent integers or otherwise denote discrete levels or steps in a hierarchy of levels, each successive level increasing in detail or pixel resolution. If the detail level M of the output images 110a is still lower than that of the desired detail level D, the DL neural networks 104 may execute another iteration using the output images 110a as image-based input (114) for correlation with the geo-specific datasets 108a-f to generate output images 110b at the next highest detail level (e.g., a detail level N higher than the detail level M of the output images 110a). The iterative process may continue as the DL neural networks 104 generate subsequent output images 110c, 110d, ... of increasing detail level and resolution until final output images 110n are generated having the desired detail level D (e.g., and target pixel resolution as provided for by the target resolution data 108f).

In embodiments, the trained DL neural networks 104 may be configured for run-time generation of the final output images 110n having the desired detail level and target resolution, based on the geo-specific datasets 108a-f, basemap imagery 112, and intermediate output images 110, 110a-d of increasing detail and resolution. Regardless of detail level, any output images 110, 110a-n generated by the DL neural networks 104 include photorealistic typical content consistent with the geo-specific datasets 108a-f.

Figure 2A:
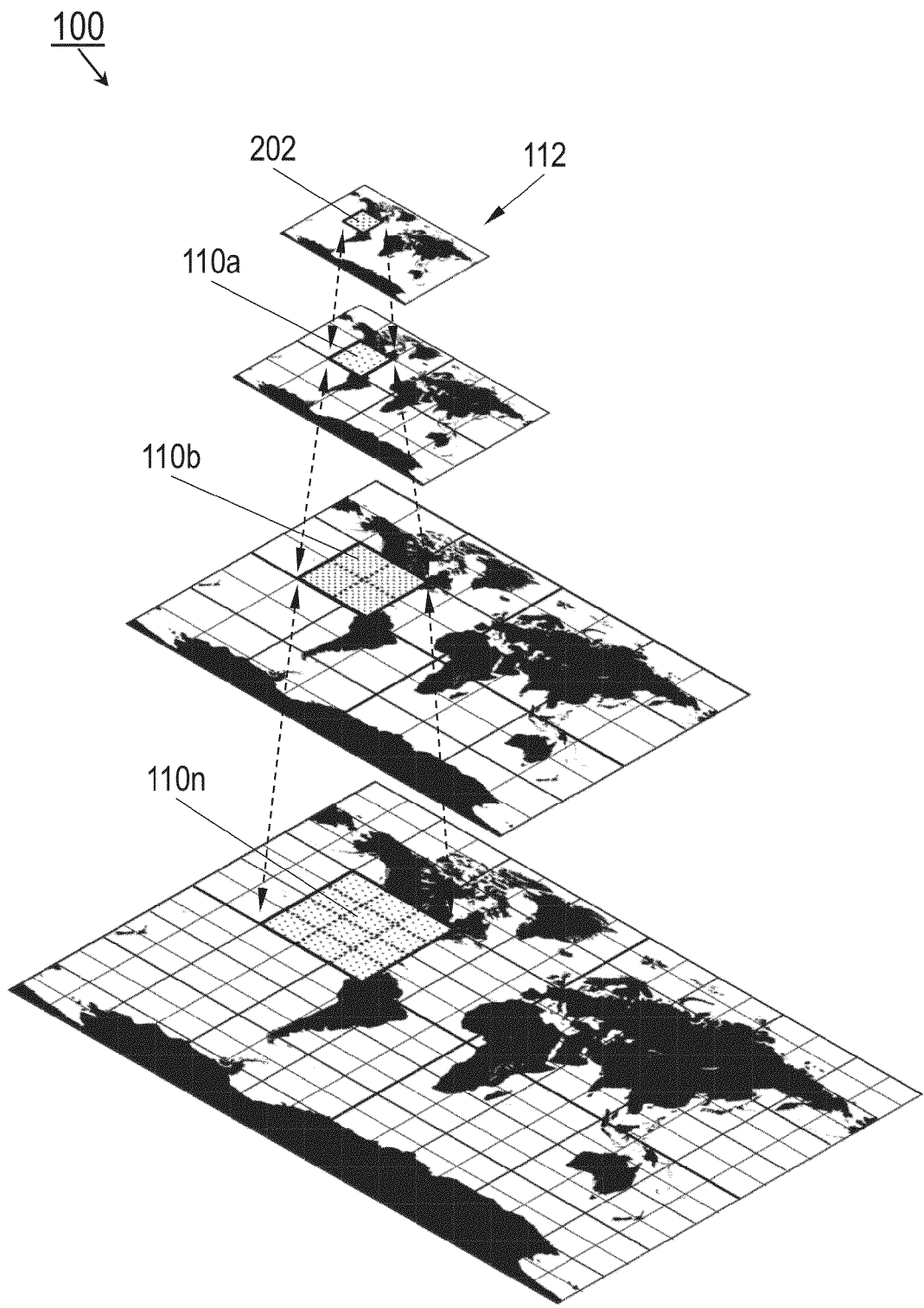
FIGS. 2A and 2B illustrate operations of the simulator environment of FIG. 1.
Figure 2B:
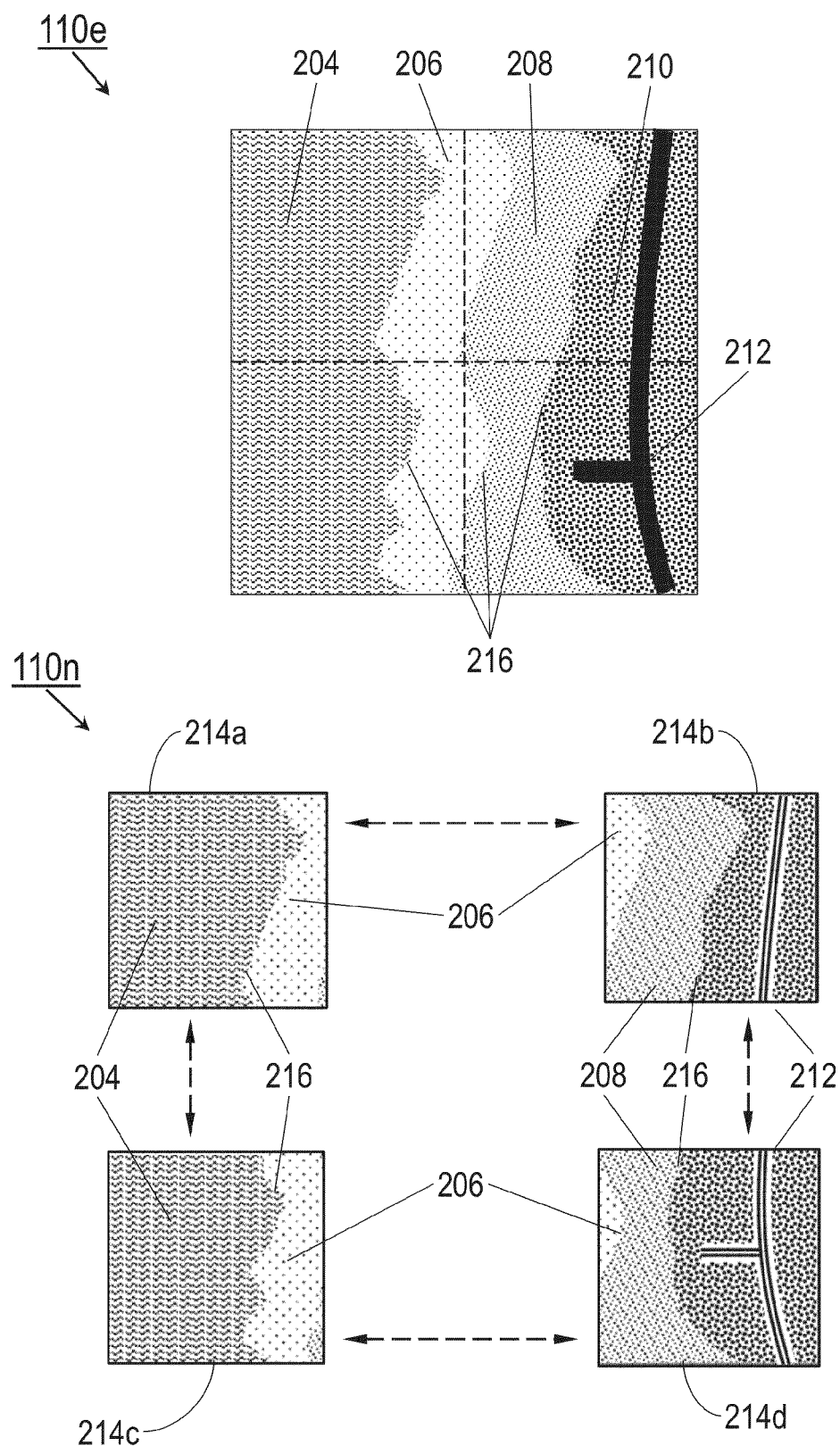

In embodiments, referring to FIGS. 2A and 2B, the DL neural networks (104, FIG. 1) of the simulator environment 100 may generate output images (110n, FIG. 1) preserving spatial coherence in multiple dimensions. For example, referring to FIG. 2A, spatial coherence may be preserved between basemap imagery 112 and output images 110*a-n* of varying detail levels and resolutions. For example, a subset input image 202 (e.g., a subset of the basemap imagery 112) may be at the minimal detail level of the basemap imagery but may include discernible details with respect to, e.g., natural features and manmade structures. The subsequent output image 110*a* (e.g., generated by the correlation of geo-specific datasets (108*a-f*, FIG. 1) to the subset input image 202) at the next highest detail level may correlate the natural features and/or manmade structures identified within the subset input image 202 with, e.g., accurate labeling of features and structures and, where applicable, geotypical content representation of these features and structures. The DL neural networks (104, FIG. 1) may preserve the accurate labeling and geotypical content representation of any identified content through subsequent output images 110*b*-110*n* of increasing detail level and resolution.

In embodiments, referring also to FIG. 2B, the DL neural networks 104 may preserve spatial coherence among adjacent tiles within an output image or images (110*n*) having (or sharing) a detail level. For example, the output image 110*e* (having a detail level directly below that of the target detail level) may include typical representations (e.g., due to the correlation of input images (106, FIG. 1) with the geo-specific datasets (108*a-f*, FIG. 1)) of ocean (204), surf (206), beach (208) and scrub/grassland (210) areas as well as nearby roadways (212).

In embodiments, the output image 110*n*, at the next highest level of detail (e.g., the target detail level and pixel resolution) may be a composite image comprising mutually adjacent image tiles 214*a-d*, together corresponding to the same location as portrayed in the output image 110*e*. For example, the output image 110*d* may establish typical boundaries 216 between the ocean areas 204 and surf areas 206, between the surf areas 206 and the beach areas 208, and the beach areas 208 and scrub areas 210. The mutually adjacent image tiles 214*a-d* of the output image 110*n* may preserve these typical boundaries 216 relative to each other, as well as the positioning and coloring of the roadway 212 between the adjacent image tiles 214*a-d*.

Figure 3:
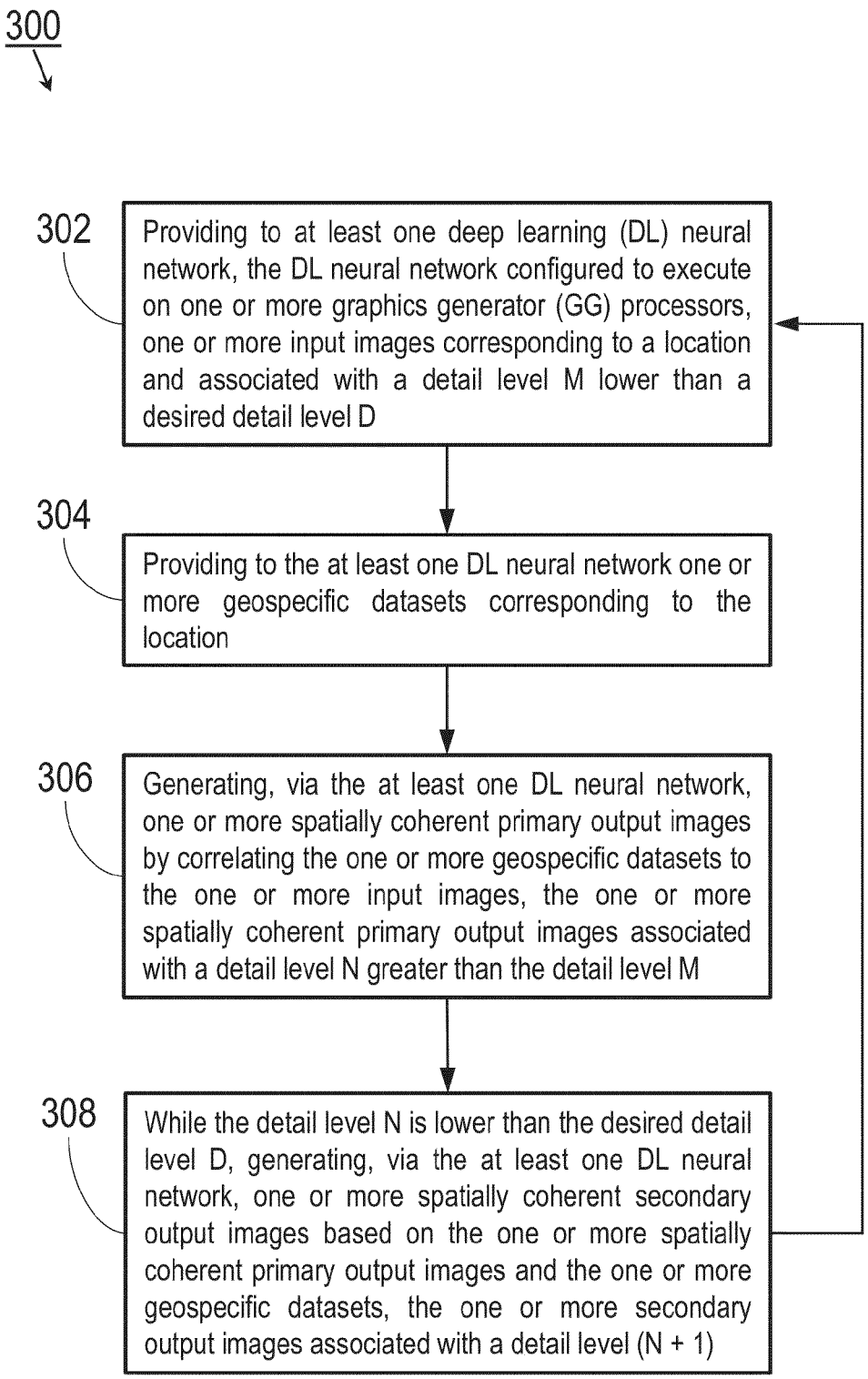
FIG. 3 is a flow diagram illustrating a method for generating spatially coherent photorealistic geo-specific imagery in accordance with example embodiments of this disclosure.

Referring to FIG. 3, the method 300 may be implemented by the simulation environment 100 of FIG. 1 and may include the following steps.

At a step 302, image-based input corresponding to a location (e.g., a desired location within the Earth or some other geographical area) is provided to DL neural networks running on graphics generator (GG) processors of the simulation environment; the image-based input may have a resolution or detail level M lower than a desired or target detail level D. For example, the image-based input may be non-generated basemap imagery having a minimal detail level (e.g., detail level 0). The image-based input may be output images generated by the simulation environment from prior image-based input having a lower level of detail.

At a step 304, one or more geo-specific datasets are provided to the DL neural networks. For example, the geo-specific datasets may include, but are not limited to: geographical vector data; elevational data; ecological and biome data; land-use data; infrared (IR) or near-IR imagery of the location; and a target detail level or pixel resolution for the final output image/s.

At a step 306, the DL neural networks generate spatially coherent primary output images having photorealistic, geotypical image content by correlating the geo-specific datasets to the image-based input of detail level M. For example, the generated spatially coherent primary output images may have a detail level N greater than the detail level M. The generated primary output images may be generated at runtime; e.g., as part of a simulator program. The generated primary output images may preserve spatial coherence with the lower-detail image-based input from which they were generated. Similarly, the generated primary output images may preserve spatial coherence of image components, elements, and objects between mutually adjacent tiles having a common detail level. The detail level N may be equivalent to the desired detail level D, in which case the generated spatially coherent primary output images will be the final output images.

At a step 308, while the detail level N of the generated output images is less than the desired detail level D, the DL neural networks correlate the geo-specific datasets to the generated primary output images of detail level N, thereby generating spatially coherent secondary output images of detail level (N + 1). Again, if the detail level (N + 1) is equivalent to the desired detail level D, the generated secondary output images will be the final output images; otherwise, the cyclical correlation process continues.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A simulation environment, comprising:
  one or more graphics generation (GG) processors;
  at least one non-transitory memory unit in communication with the GG processors, the memory unit configured for storing one or more of:
    a set of spatially coherent basemap images associated with a geographical area and with a minimal detail level; and
    a geo-specific dataset associated with one or more characteristics of the geographical area; and
  one or more deep learning (DL) neural networks configured to execute on the GG processors, the one or more DL neural networks configured to generate at least one spatially coherent target image, the target image associated with at least one location within the geographical area and a target detail level D by, for at least one detail level N greater than the minimal detail level:
    receiving one or more input images corresponding to the at least one location and to a detail level M lower than the detail level N;
    receiving the one or more geo-specific datasets corresponding to the at least one location;

generating one or more spatially coherent primary output images corresponding to the at least one location and associated with the detail level N by correlating the one or more geo-specific datasets to the one or more input images; and while the detail level N is lower than the target detail level D, generating, in real time while the geographical area is being traversed in the simulation environment, one or more spatially coherent secondary output images corresponding to the at least one location and associated with a detail level N + 1 by correlating the one or more geo-specific datasets to the one or more spatially coherent primary output images, wherein the one or more geo-specific datasets include at least one of:

geographical vector data;

ecological data;

infrared imagery data configured to be used to improve an accuracy of generated foliage in the one or more spatially coherent primary output images;

near-infrared imagery data configured to be used to improve the accuracy of generated foliage in the one or more spatially coherent primary output images; or land-use data,
and wherein each of the one or more geo-specific datasets includes data indicating a presence of one or more types of features, and wherein the one or more spatially coherent primary and secondary output images depict the one or more types of features and the one or more types of features are spatially coherent across the one or more spatially coherent primary and secondary output images.

2. The simulator environment of claim 1, wherein:

the one or more geo-specific datasets include the geographical vector data corresponding to the at least one location, the geographical vector data including at least one of a manmade structure, a waterway, a building, a roadway, and a labeled data element.

3. The simulator environment of claim 1, wherein the one or more geo-specific datasets include elevational data corresponding to the at least one location.

4. The simulator environment of claim 1, wherein the one or more geo-specific datasets include at least one of the ecological data and climatic data corresponding to the at least one location.

5. The simulator environment of claim 1, wherein the one or more geo-specific datasets include the land-use data corresponding to the at least one location.

6. The simulator environment of claim 1, wherein the one or more geo-specific datasets include at least one of the infrared imagery data and the near-infrared imagery data corresponding to the at least one location.

7. The simulation environment of claim 1, wherein the one or more input images correspond to the set of spatially coherent basemap images.

8. The simulation environment of claim 1, wherein the one or more primary output images and the one or more secondary output images are mutually spatially coherent with the one or more input images.

9. The simulation environment of claim 1, wherein at least one of the one or more primary output images and the one or more secondary output images includes one or more mutually geographically adjacent images.

10. A method for generating spatially coherent photorealistic geo-specific imagery, the method comprising:

providing to at least one deep learning (DL) neural network, the DL neural network configured to execute on one or more graphics generator (GG) processors, one or more input images corresponding to a location and associated with a detail level M lower than a desired detail level D;

providing to the at least one DL neural network one or more geo-specific datasets corresponding to the location;

generating, via the at least one DL neural network, one or more spatially coherent primary output images by correlating the one or more geo-specific datasets to the one or more input images, the one or more spatially coherent primary output images associated with a detail level N greater than the detail level M; and while the detail level N is lower than the desired detail level D, generating, via the at least one DL neural network in real time while a geographical area is being traversed in the simulation environment, one or more spatially coherent secondary output images by correlating the one or more geo-specific datasets to the one or more spatially coherent primary output images, the one or more secondary output images associated with a detail level N + 1, wherein the one or more spatially coherent primary and secondary output images depict the one or more types of features and the one or more types of features are spatially coherent across the one or more spatially coherent primary and secondary output images.

wherein the one or more geo-specific datasets include at least one of:

geographical vector data;

ecological data;

infrared imagery data configured to be used to improve an accuracy of generated foliage in the one or more spatially coherent primary output images;

near-infrared imagery data configured to be used to improve the accuracy of generated foliage in the one or more spatially coherent primary output images; or land-use data;
and wherein each of the one or more geo-specific datasets includes data indicating a presence of one or more types of features, and wherein the one or more spatially coherent primary output images depict the one or more types of features and the one or more types of features are spatially coherent across the one or more spatially coherent primary output images.

11. The method of claim 10, wherein generating, via the at least one DL neural network, one or more spatially coherent primary output images by correlating the one or more geo-specific datasets to the one or more input images includes:

generating one or more primary output images spatially coherent with the one or more input images.

12. The method of claim 10, wherein generating, via the at least one DL neural network, one or more spatially coherent primary output images by correlating the one or more geo-specific datasets to the one or more input images includes:

generating at least one plurality of mutually spatially coherent primary output images.

13. The method of claim 10, wherein generating, via the at least one DL neural network, one or more spatially coherent primary output images by correlating the one or more geo-specific datasets to the one or more input images includes:

generating at least one plurality of mutually geographically adjacent primary output images.

14. The method of claim 10, wherein the providing to the at least one deep learning (DL) neural network, the one or more input images includes:

providing to the at least one DL neural network at least one set of spatially coherent basemap images associated with a minimal detail level.

\* \* \* \* \*